United States Patent [19]

Taylor

[11] Patent Number: 5,575,306
[45] Date of Patent: Nov. 19, 1996

[54] RELIEF VALVE TRIGGER FOR RELATIVELY LARGE DIAMETER FLUID PRESSURE CONTAINERS

[76] Inventor: Julian S. Taylor, 8300 SW. 8th, Oklahoma City, Okla. 73128

[21] Appl. No.: 419,656

[22] Filed: Apr. 10, 1995

[51] Int. Cl.⁶ .......................... F16K 17/14; F16K 31/365
[52] U.S. Cl. ................................. 137/70; 251/73
[58] Field of Search ................... 137/70; 251/73, 251/94

[56] References Cited

U.S. PATENT DOCUMENTS

| | | | |
|---|---|---|---|
| 2,297,003 | 9/1942 | Larson | 251/73 X |
| 2,497,860 | 2/1950 | Brown | 251/73 X |
| 3,443,572 | 5/1969 | Lavigne, Jr. et al. | 137/70 |
| 3,620,237 | 11/1971 | Sindall et al. | 251/73 X |
| 4,033,374 | 7/1977 | Danon | 251/73 X |
| 4,309,022 | 1/1982 | Reinicke et al. | 251/73 X |
| 4,587,987 | 5/1986 | West | 137/70 |
| 5,012,834 | 5/1991 | Taylor | 137/70 |

*Primary Examiner*—John Rivell
*Attorney, Agent, or Firm*—Robert K. Rhea

[57] ABSTRACT

A pressure relief valve trigger is formed by a diaphragm chamber communicating with fluid in a container being monitored by a pressure collapisible pin axially maintaining the diaphragm in the chamber in a given position. A flapper valve latch member released by movement of the diaphragm in response to collapse of the pin releases a flapper valve on the container to open in response to fluid pressure above a predetermined value biasing the diaphragm to a pin collapsed position.

6 Claims, 4 Drawing Sheets

5,575,306

1

RELIEF VALVE TRIGGER FOR RELATIVELY LARGE DIAMETER FLUID PRESSURE CONTAINERS

BACKGROUND OF THE INVENTION

1. Field of the Invention

This invention relates to relief valves and more particularly to a collapsible pin relief valve trigger for releasing a valve flapper or piston on a relatively large diameter pressure fluid container in response to a predetermined pressure in the container acting on the valve trigger.

In the past, I have sucessfully produced collapsible pin relief valves utilizing Eulers Law acting on a pin for monitoring pressure in a conductor generating axial forces up to approximately 16,000 pounds (7200 kg) against the pin.

There is a need for a relief valve trigger to monitor relatively high fluid pressure in a container of relatively large diameter, for example, 5 feet 6 inches (1.70 m).

This invention solves this problem by providing a relief valve trigger mounted exteriorly of a container to be monitored and communicating with the fluid therein which releases a container closure member in response to fluid pressure above a predetermined value by the collapse of a collapsible pin.

2. Description of the Prior Art

The most pertinent prior patent is believed to be my U.S. Pat. No. 5,012,834 issued May 7, 1991 for FLUID PRESSURE FLARE RELIEF VALVE. This patent discloses a valve body connected with a fluid line in which the valve body is enlarged and provided with a lateral opening normally closed by a double wall valve head to form a valve head chamber laterally of a fluid passageway through the valve body. The fluid passageway contains a chamber having aligned bores in opposite walls normally closed by dual pistons secured to a piston rod projecting through the valve head chamber and through the closed end of a cylinder projecting into the valve head chamber and through the closed end of a cylinder projecting into the valve head chamber and slidably supporting a smaller diameter pilot piston secured to the piston rod. The outwardly projecting end of the piston rod supports one end of an excess fluid pressure collapsible pin supported at its other end by the end plate of a pin cage surrounding the collapsible pin and connected with the cylinder projecting out of the valve head chamber. A spring urged poppet valve admits upstream fluid pressure to the valve head chamber so that excess pressure above a predetermined value against the pilot piston and the piston remote from the valve head chamber unbalances the pistons, collapsing the pin to release the excess pressure through the passageway downstream outlet.

This invention is distinctive over this patent by providing a relief valve trigger mounted exteriorly of a vessel containing fluid to be monitored which features a diaphragm releasably connected with a closure member for the fluid being monitored in which excess fluid pressure moves the diaphragm to a closure member released open position and releasing the fluid pressure in the chamber being monitored. Other distinct differences are the moveable pressure containing member is held rigidly in a compressed seal contact until triggered to an open mode by a set upstream fluid pressure, the opening force to open is cushioned to limit the opening velocity of the moveable pressure containing member, and the weight of the moveable pressure containing member is compensated.

SUMMARY OF THE INVENTION

This pressure relief valve trigger comprises a body mounted on or adjacent a closure member of a container having fluid to be pressure monitored. The body is provided with a diaphragm chamber and a diaphragm releasably connected with a moveable pressure containing member, hereinafter referred to as "flapper valve," closing a fluid pressure release opening of a container being monitored, normally maintained in closed position by a cage mounted axially collapsible pin secured to the body and diaphragm.

Fluid in the container being monitored is in communication with the side of the diaphragm opposite the position of the collapsible pin. Excess pressure above a predetermined value in the container being monitored forces the diaphragm toward and collapses the collapsible pin and simultaneously releases a latch, normally holding the fluid pressure biased open flapper valve in closed position.

In the example shown, the flapper valve is also gravity biased toward an open position and a fluid containing piston cylinder interposed between the axial outer surface of the flapper valve and a fixed support cushions the opening of the flapper.

The principal object of this invention is to provide a pressure relief valve trigger for communication with fluid in a container being monitored and normally maintain a flapper valve in closed sealed position which will release the flapper valve to open in response to fluid pressure in the container and trigger above a preset value, axially collapsing a collapsible pin.

DESCRIPTION OF THE PREFERRED EMBODIMENTS

Like characters of reference designate like parts in those figures of the drawings in which they occur.

Figure 1:
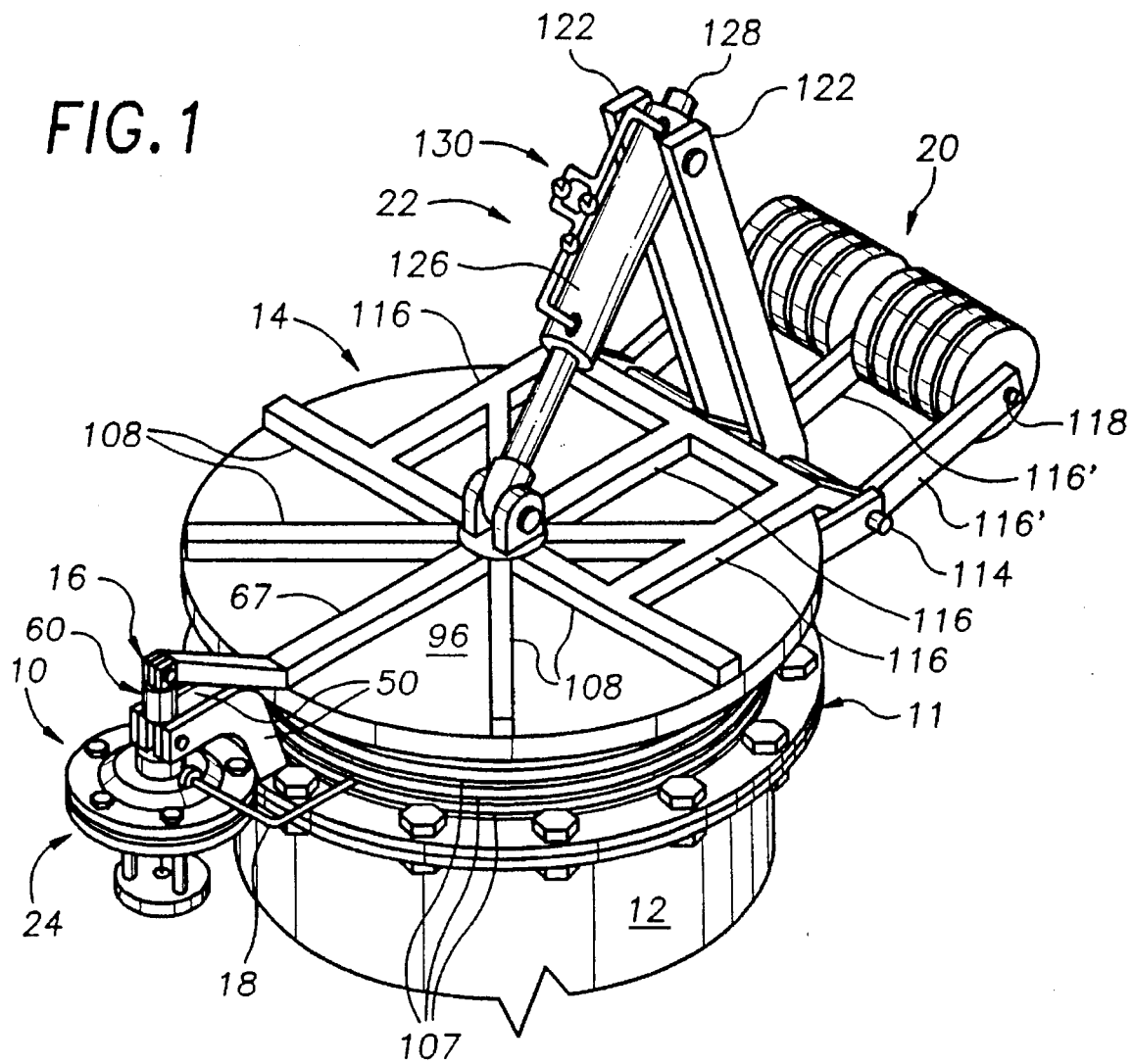
FIG. 1 is a fragmentary perspective view of the relief valve trigger mounted on a container being fluid pressure monitored.

Referring first to FIG. 1 the reference numeral 10 indicates a relief valve opening trigger assembly mounted on peripheral flange means 11 adjacent the open end of a conductor or container 12. The container is normally closed by a cap-like flapper valve assembly 14 having a latch arm means 67 connected with trigger means 16. The latch arm 67 is released by the trigger latch means when fluid under pressure, supplied to the relief valve trigger means from the container 12, by a tube 18, surpasses a predetermined critical value permitting the flapper valve 14 to be opened by fluid pressure and counterweights 20. The flapper valve opening action is cushioned by shock absorber means 22 and maintains the flapper valve in opened position until manually released.

Figure 4:
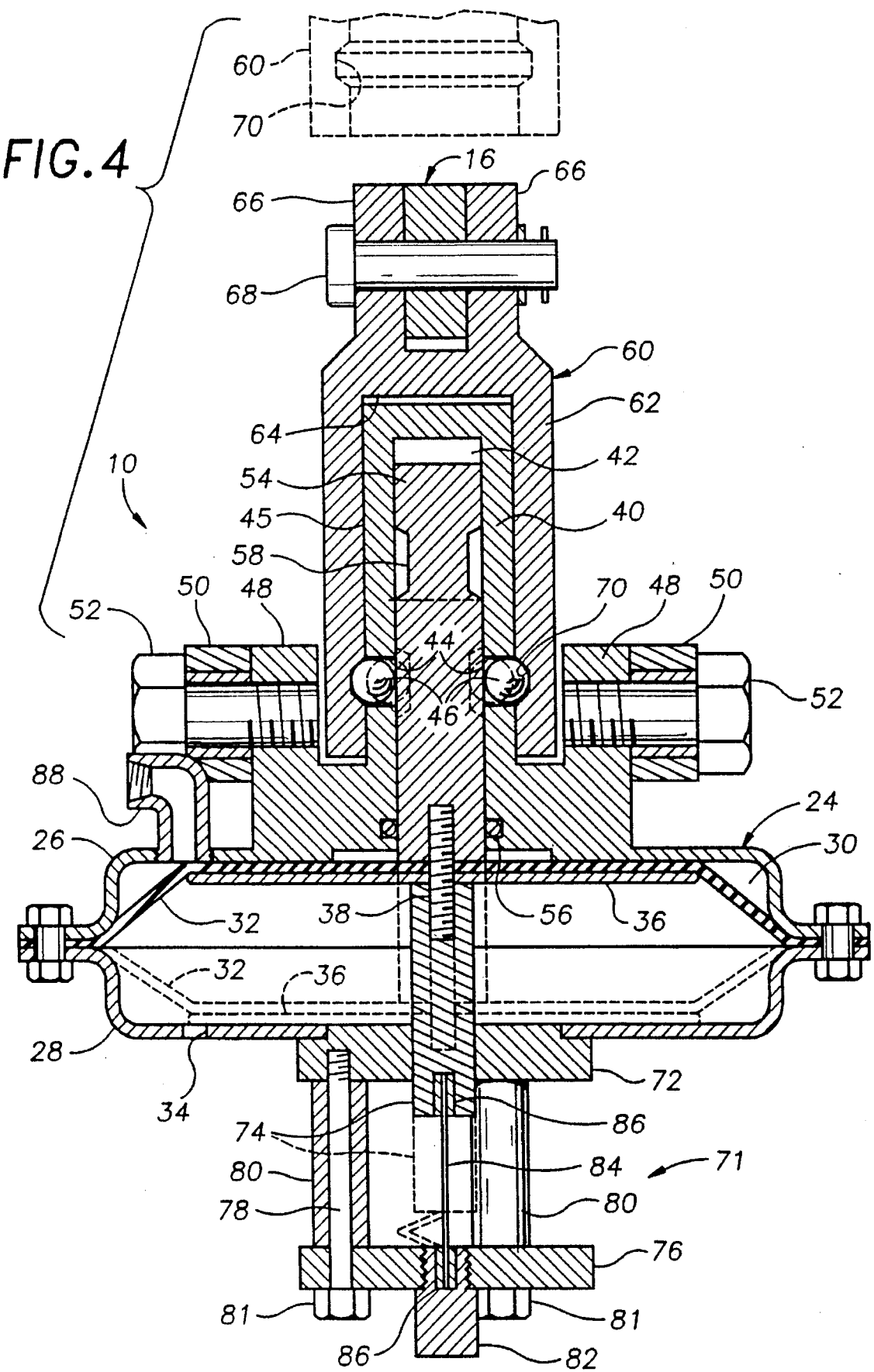
FIG. 4 is a vertical cross section view taken substantially along the line 4—4 of FIG. 2 and illustrating, by broken lines, a fragment of the flapper valve latch arm in released position; and, FIG. 5 is a mechanical diagram illustrating fluid dampening control of the shock absorbing piston cylinder.

Referring also to FIG. 4, the trigger assembly 10 includes a diaphragm body 24 formed by a flanged edge top half 26 bolted to a companion bottom half 28 forming a diaphragm chamber 30 having a diaphragm 32 interposed between the flange edges, the body bottom half 28 having a vent hole 34.

A backup plate 36 underlies the diaphragm 32 and is axially connected with an all-thread rod 38 for the purposes presently explained.

The diaphragm body top member 26 supports a ball cage 40 formed by an upstanding closed end cylindrical member forming a downwardly open socket 42. The cage 40 is provided with a plurality of horizontally aligned apertures 44 in its wall 45 for nesting a peripheral portion of a like plurality of balls 46 each having a diameter greater than the thickness of the ball cage wall for the purposes presently explained.

The diaphragm body member 26 further supports a pair of parallel upstanding ears 48 on diametrically opposite sides of the ball cage 40 which are line drilled and threaded. The ears 48 are interposed between a pair of parallel trigger means support arms 50 rigidly connected at their other ends with the flange means 11 adjacent the flapper valve 14. The end portions of the arms 50, opposite the flange means, are similarly line drilled and connected with the ears 48 by a pair of bearing equipped bolts 52.

A lock mandrel 54 is slidably received by the ball cage socket 42 and sealed fluid tight at its depending end portion with the diaphragm body top member 26, as by an O-ring 56. The depending end of the lock mandrel is centrally bored and threaded for receiving the upstanding end portion of the all-thread rod 38 projecting above the diaphragm on the support 36.

Adjacent its top end, the lock mandrel 54 is provided with an annular groove 58 having a transverse width greater than the diameter of the balls 46 and a depth slightly less than a hemispherical portion of the balls 46 for nesting a hemispherical portion of the balls when the lock mandrel groove 58 is cooperatively disposed in the plane of the circular array of the balls 46 as will presently be explained.

The latch arm means 16 comprises a release latch 60, having a cylindrical end portion 62 forming a downwardly open socket 64, normally nesting the major portion of the ball cage 40. The other end portion of the release latch 60 defines a clevis characterized by a pair of parallel clevis arms 66 which cooperatively receive the end portion of flapper valve latch arm 67 radially secured to and projecting beyond the flapper valve periphery. The clevis arms 66 and adjacent end portion of the latch arm 67 are line drilled for receiving a clevis pin 68, thus, pivotly connecting the flapper valve release latch 60 with the latch arm 67 for the reasons presently explained.

Adjacent its depending end the inner wall surface of the latch, defining the cylinder socket 64, is annually recessed to form a groove 70 having a transverse width substantially equal to the diameter of the balls 46 for nesting a hemispherical portion of the balls 46, normally maintained in the groove 70 by the lock mandrel 54. This locks the latch cylinder 62 to the ball cage 40 and maintains the flapper valve assembly 14 in closed and compressed seal position on the container 12 until released by the collapse of a pin in a collapsible pin cage means 71 normally maintaining the mandrel 54 in latch cylinder 62 locked position, as presently explained.

A pin cage base 72 is coaxially connected with the diaphragm body bottom member 28 and is centrally bored for receiving a pin support shaft 74 having its upper end portion centrally bored and threaded for receiving the adjacent end portion of the all-thread rod 38 and maintaining the diaphragm plate 36 in contiguous contact with the central portion of the diaphragm 32 and the latter disposed adjacent the inner limit of the diaphragm body member 26.

A pin plate 76 is coaxially supported with respect to the pin shaft 74 by a plurality, (3) only two being shown, posts 78 threadedly secured to the cage base 72 and impinging a like plurality of sleeves 80 surrounding the respective post between the base plate 72 and end plate 76 by nuts 81.

A pin holding nut 82 is threadedly connected axially with the pin end plate 76. The adjacent end portion of the pin shaft 74 and pin holding nut 82 are centrally bored for coaxially receiving respective end portions of a pressure collapsible pin 84. A tapered insert 86 within the respective end portion of the shaft 74 and holding nut 82 surrounds the adjacent end portion of the collapsible pin 84.

A fitting 88 communicating with the diaphragm chamber 30 on the side of the diaphragm 32 opposite the collapsible pin 84 connects the fluid pressure conducting flexible pilot tube 18 with the diaphragm chamber 30 for fluid pressure release of the flapper valve release latch 60 as explained hereinbelow.

Figure 3:
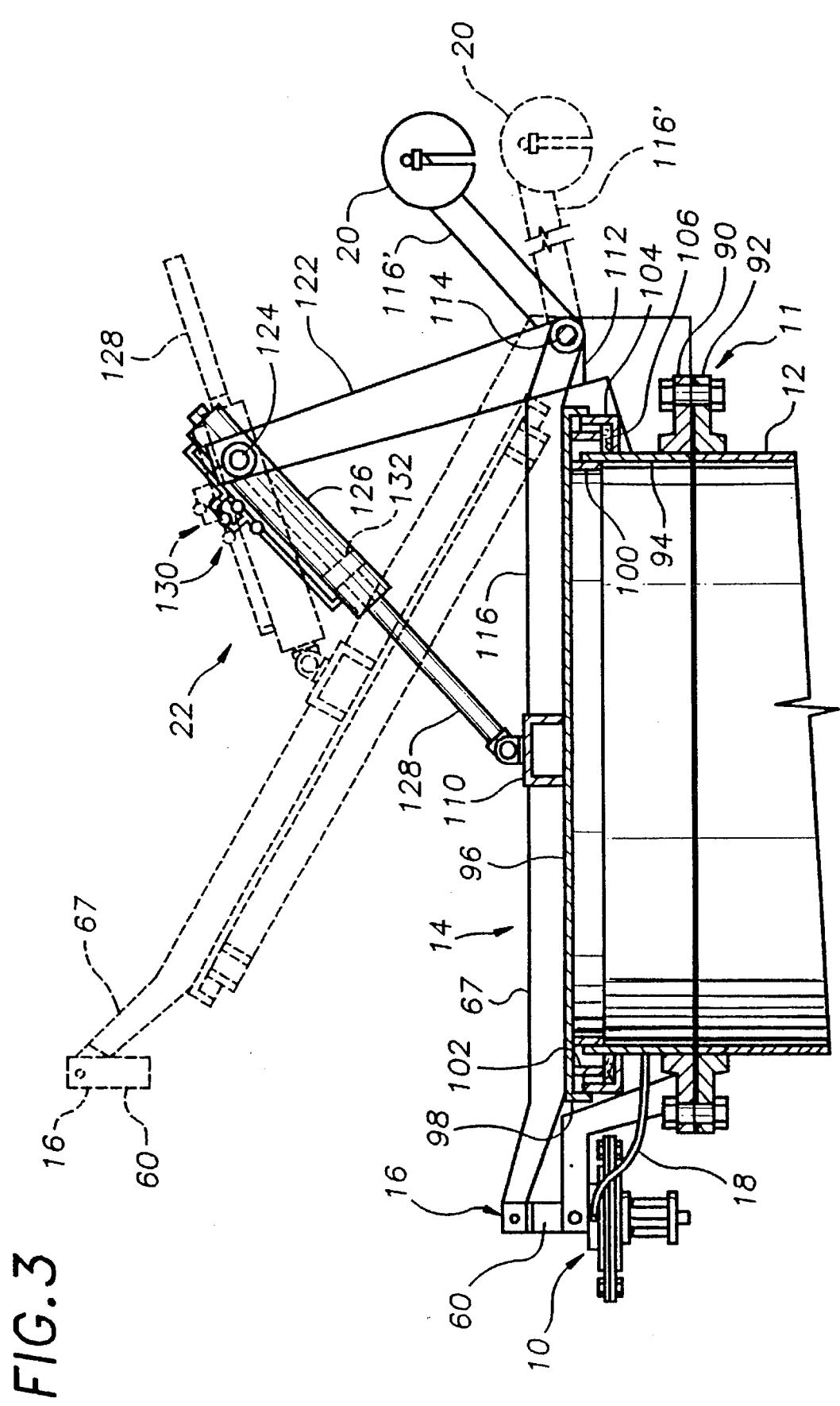
FIG. 3 is a vertical cross sectional view, partially in elevation, taken substantially along the line 3—3 of FIG. 2 and illustrating the open position of the container flapper valve by broken lines.

Referring also to the remaining figures, the flange means 11 comprises upper and lower flanges 90 and 92, as viewed in FIG. 3, bolted together with a flange seal therebetween. The flange 92 being secured to the upper end portion of the container wall 12. A relatively short sleeve body 94 is rigidly secured by its lower end peripheral portion to the upper flange 90. A flapper valve plate 96 axially overlies the upper end of the sleeve body 94 with an annular outer skirt 98 depending from its outer perimeter in outward spaced relation with respect to the adjacent peripheral upper end portion of the sleeve body 94.

An annular inner skirt 100 coaxially depends from the plate 96 adjacent the inner perimeter of the upper end portion of the sleeve body 94.

A seat lip 102 depends from the plate 96 between the outer and inner skirts 98 and 100 and adjacent the outer perimeter of the upper end portion of the sleeve body 94.

An annular seal trough 104 is secured to the outer periphery of the upper end portion of the sleeve body 94 below the depending limit of seat lip 102. The seal trough 104 receives an annular seat ring 106 for sealing with the seat lip. A plurality, three (shown only in FIG. 1), of vertically spaced cooling fins 107 surround the sleeve body 94 between the seal trough 104 and the top flange 90.

In addition to the latch arm 67, a plurality of plate braces 108 project radially outward from the plate hub 110. A pair of supports 112 are secured at one end portion to the top portion of the flapper valve assembly 14 and project in parallel spaced relation in a direction opposite the trigger means 10.

The end portion of the supports 112 opposite the trigger means 10 are transversely bored in cooperative relation for receiving a flapper valve main shaft 114.

A plurality of flapper valve arms 116, three in the example shown, extend in parallel spaced relation from the central portion of the plate 96 in a direction opposite the trigger means 10 beyond the perimeter of the plate and are transversely apertured and journalled by the main shaft 114 permitting pivoting movement of the flapper valve assembly 14 toward and away from the sleeve body 94.

The end portions of the arms 116 projecting beyond the main shaft 114 in a direction opposite the trigger means 10 are inclined angularly upward to form counterweight support arms 116'. The end portion of the counterweight arms 116' projecting beyond the perimeter of the plate are transversely apertured for cooperatively receiving a counterweight shaft 118. A plurality of the counterweights 20 having a total mass selected in accordance with the mass of the flapper valve assembly 14 are supported by the counterweight shaft 118 for the purposes presently explained.

A pair of upstanding shock absorber cylinder support arms 122 are connected at their depending end portions in parallel spaced relation with the top flange 90 and main shaft 114 on either side of the central support arm 116 and project angularly upward over the flapper valve 14 from the main shaft 114 and support, between their upper end portions, a bearing shaft 124 journalling one end portion of the shock absorber means cylinder 126.

Figure 5:
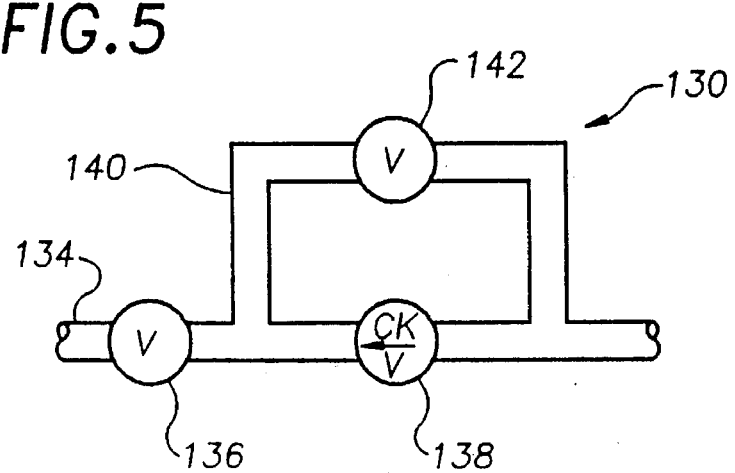
Figure 2:
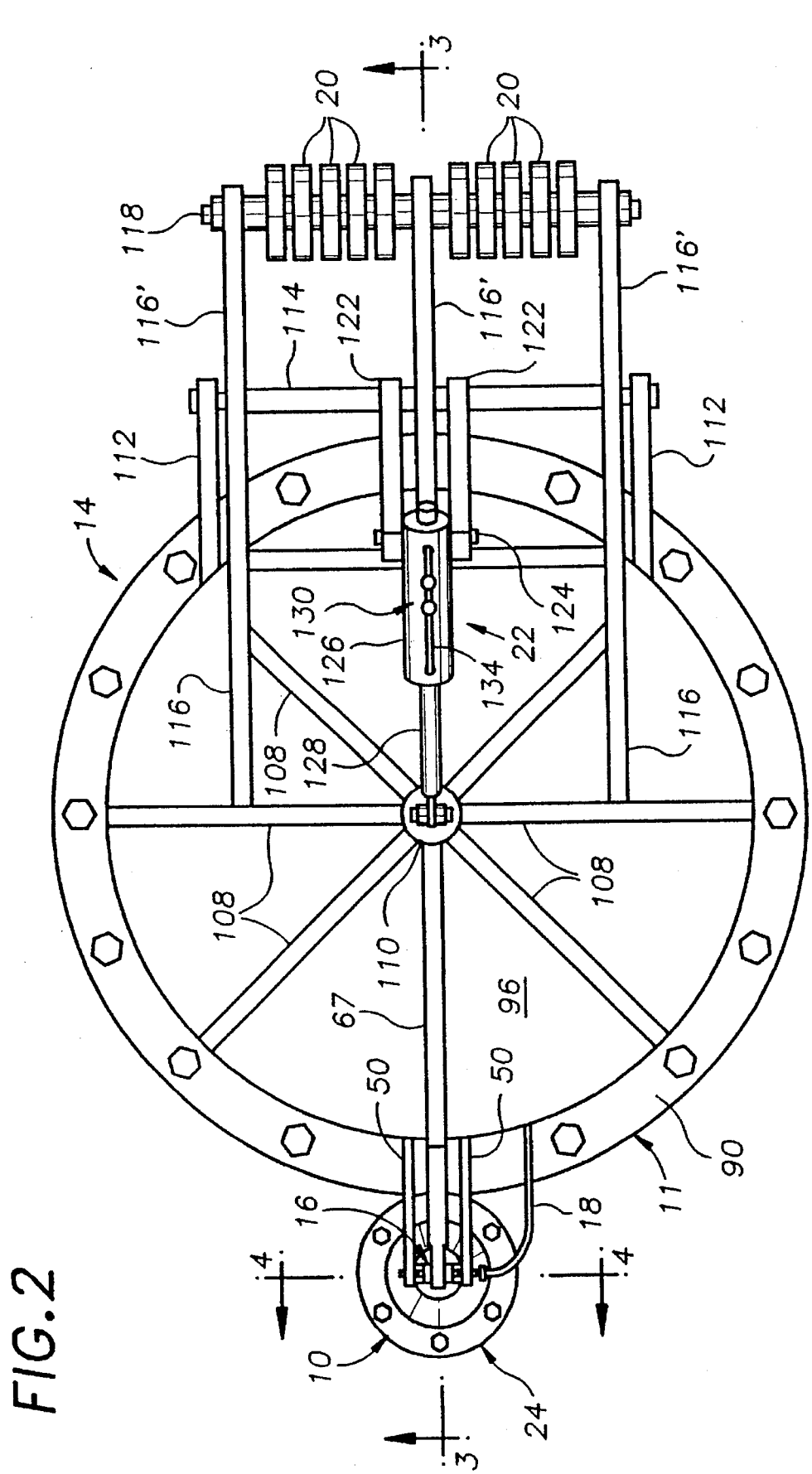
FIG. 2 is a top view of FIG. 1 to a larger scale.

The cylinder slidably supports a through piston rod 128 secured at its end portion opposite the bearing shaft 124 with the hub 110. The cylinder 126 is provided with fluid flow restrictor means 130 (FIG. 5) mounted exteriorally of the cylinder wall and connected with respective ends thereof on opposite sides of the cylinder piston 132 by a line 134 containing a valve 136 and check valve 138 in series. The check valve 138 permits fluid flow toward the valve plate 96 only.

A second fluid bypass line 140 is connected at one end with the line 134 between the valve 136 and check valve 138 and connected at its other end with the line 134 between the check valve and the bearing support 124. A second normally closed valve 142 is interposed in the line 140, thus preventing reverse fluid flow in the cylinder and with the counterweights 20, maintains the flapper valve in open position until manually released to close as hereinafter described.

Operation

Assuming the trigger means 10 and flapper valve assembly 14 and its components have been secured to the container 12 as described hereinabove.

The latch arm 67 secured to the clevis arms 66 maintains the flapper valve assembly 14 sealed with the sleeve body 94 against tension as a result of the lip 102 being forced into the seal ring 106 and the latch 60 releasably secured to the ball cage 40 by the balls 44. Operating fluid under normal operating pressure in the container 12 is supplied to the diaphragm chamber 30, on the top side of the diaphragm 32 as viewed in FIG. 4, through the tube 18 with the collapsible pin 84 maintaining the diaphragm in its solid line position of FIG. 4.

When fluid pressure in the container 12 and the diaphragm chamber 30, on the mandrel 54 connected side of the diaphragm 32, exceeds a predetermined value the fluid pressure forces the diaphragm 32, mandrel 54 and pin shaft 74 downwardly, toward the dotted line position of FIG. 4, collapsing the pin 84, as illustrated by dotted lines.

The lock mandrel moves downwardly until its groove 58 admits a spherical portion of each of the balls 44, releasing the latch 60 and fluid pressure in the container 12 forces the flapper valve assembly 14 upwardly which opens to its dotted line position of FIG. 3, assisted by the mass of the counter-weights 20 and cushioned by the cylinder 126.

When the problem has been corrected, the flapper valve assembly 14 and components may be returned to closed position by opening the normally closed valve 142 to allow the cylinder piston 132 to move the fluid in the cylinder to its upwardly disposed end as the flapper valve is moved downwardly, to its solid line position of FIG. 3, and the latch 60 surrounds the ball cage 40. The valve 142 is reclosed and the mandrel 54 is moved to the line solid position of FIG. 4. Simultaneously the mandrel 54 forces peripheral portions of the balls 44 into the latch groove 70.

The collapsed pin 84 is removed by removing the pin holding nut 82 and moving the pin shaft 74 and diaphragm 32 upwardly. A new pin, not shown, is inserted between the holding nut 82 and pin shaft 74, permitting the container 12 to again be refilled with fluid under a selected operating pressure.

Obviously the invention is susceptible to changes or alterations without defeating its practicability. Therefore, I do not wish to be confined to the preferred embodiment shown in the drawings and described herein.

I claim:

1. A fluid pressure sensing trigger for releasing a flapper valve latch arm to open a container containing fluid under pressure at a predetermined pressure, comprising:

a disc-like body having opposing walls forming a diaphragm chamber and having a diaphragm in the chamber normally disposed adjacent one said body wall;

tube means communicating with the diaphragm chamber between the diaphragm and said one body wall and communicating with the fluid in the container;

ball cage means including an annular wall axially supported by said body and having a plurality of transverse apertures disposed in a circular array;

trigger latch means including a wall surrounding said ball cage wall and having an annular groove in its inner periphery normally disposed adjacent the ball cage apertures;

clevis means on said trigger latch means for securing a flapper valve latch arm to said trigger latch means;

a like plurality of balls in the ball cage apertures for securing the trigger latch means to the ball cage means;

a mandrel secured to said diaphragm and slidable in the ball cage means by movement of said diaphragm toward and away from said body walls for normally maintaining a peripherial portion of each ball of said plurality of balls in the trigger latch means wall groove, said mandrel having an annular groove in its end portion opposite the diaphragm for nesting a peripheral portion of each ball of said plurality of balls when the diaphragm is disposed adjacent the said other body wall;

a pin guide secured to said diaphragm opposite the mandrel and projecting axially outward through the other said body wall; and, collapsible pin means including a pin having a predetermined buckling point axially supported by the outwardly projecting end of the pin guide for maintaining said mandrel in trigger latch means locked position while fluid pressure in the a container being monitored generates less axial force than the buckling point of the pin.

2. A fluid pressure sensing trigger for releasing a flapper valve sealing member to open a fluid container when fluid pressure in the container reaches a predetermined value, comprising:

a body forming a diaphragm chamber and having a diaphragm in the chamber;

ball cage means secured to said body and having an apertured cylindrical wall supporting a plurality of balls;

trigger latch means including a clevis adapted to be connected with a fluid container flapper valve latch arm;

mandrel means axially connected with said diaphragm and longitudinally slidable in said ball cage means between first and second positions for moving said balls into locking engagement with the trigger latch means when in said first position and releasing the trigger latch means when in said second position;

a pin guide axially secured to said diaphragm and projecting outwardly of said body opposite the mandrel means;

tubing means for providing fluid communication between fluid in a container being monitored and the diaphragm chamber on that side of the diaphragm opposite the pin guide; and, collapsible pin means including a pin having a predetermined buckling point axially supported by the outwardly projecting end of the pin guide for maintaining said mandrel in trigger latch means locked position while fluid pressure in the container is less than the buckling point of the pin.

3. A flapper valve release trigger according to claim 2 in which said trigger latch means further includes a cylinder axially opposite said clevis and surrounding the ball cage means and having an inner peripheral groove for nesting a spherical portion of said balls when in said locked position.

4. A flapper valve release trigger according to claim 3 in which the mandrel of said mandrel means is provided with a peripheral groove in its end portion opposite the diaphragm for nesting a spherical portion of said balls when the mandrel is in said second position.

5. A flapper valve for opening and closing an opening of a container containing fluid under greater than atmospheric pressure, comprising:

a sleeve body axially secured to a container around an opening in the container;

flapper valve means including a plate having an annular lip for sealing with the peripheral end portion of said sleeve body;

a flapper valve latch arm radially secured to and projecting beyond the perimeter of said plate;

fluid pressure trigger relief valve means including a collapsible pin having a predetermined buckting point supported adjacent said flapper valve;

latch means on said trigger relief valve means for releasably connecting said flapper valve latch arm with said relief valve means; and, tube means for providing fluid communication between the container and the trigger relief valve means for releasing said latch means and the flapper valve latch arm in response to a predetermined fluid pressure generating an axial force collapsing the collapsible pin.

6. A fluid container flapper valve according to claim 5 and further including:

a seat ring facing said annular lip and secured to the periphery of said sleeve body; and, a seal ring in said seat ring.

* * * * *